United States Patent Office 2,999,871
Patented Sept. 12, 1961

2,999,871
PROCESS OF IMPROVING THE ODOR OF SULFO-
ALKYL ESTERS OF FATTY ACIDS
Leslie M. Schenck, Mountainside, N.J., assignor to General Aniline & Film Corporation, New York, N.Y., a corporation of Delaware
No Drawing. Filed Dec. 1, 1959, Ser. No. 856,347
7 Claims. (Cl. 260—400)

This invention relates to a process of reducing or substantially eliminating the odor of sulfoalkyl esters of fatty acids.

The reaction of higher fatty acids with hydroxyalkane sulfuric acids to yield anionic surface active materials useful as wetting, cleansing, softening and dispersing agents is well known. In U.S. Patent 2,635,103 there is disclosed the reaction of one mole of a water soluble hydroxyethylsulfuric acid salt with less than one and more than 0.6 mole of fatty acid at temperatures of 200–300° C. at sub-atmospheric pressures for a sufficient period of time, considered as four hours or more, to complete reaction. Precautions are given to maintain an inert atmosphere with nitrogen or carbon dioxide to provide maximum assurance of a light colored product when subjecting these intermediates to prolonged high temperature conditions.

In PB Report #70344, Textilhilfsmittal-Kommission Scientific Exchanges Hoechst No. 154, Register No. 043/4, information is disclosed that the synthesis of surface active agents by a direct esterification of free fatty acids and sodium isethionate is of great commercial significance. The report notes the preparation of the intermediate "fatty acid chloride" would be eliminated by this direct procedure, and the phosphorus trichloride required for the intermediate acid chloride step would be saved. Furthermore, the report states that a fatty acid and a hydroxyethane sulfonate can be condensed by heating to about 220° C., the dehydration starting slowly at this temperature.

The Robert J. Anderson et al. patent, U.S. 2,923,724, discloses a process for preparing an ester-type anionic surface active agent which comprises heating at a temperature of 185–300° C. a monocarboxylic acid containing 8 to 22 carbon atoms with sodium isethionate in the presence of an acidic phosphorus containing compound as a catalyst and maintaining a pH range of 2.8–3.2 during the reaction.

U.S. Patent 1,881,172 makes the sodium salt of the oleic acid ester of hydroxyethane sulfonic acid (isethionic acid) by reacting sodium hydroxyethane sulfonate and oleic acid chloride at temperatures between 30° and 100° C. The resulting product is kneaded with anhydrous sodium carbonate to neutralize the same, after which the product in pure state is recovered by crystallization from alcohol.

U.S. Patent 2,821,535 describes a new and improved process for the preparation of sulfoethyl esters of fatty acids which comprises reacting under anhydrous or nearly anhydrous conditions, a mixture of a salt of isethionic acid and a fatty acid chloride, i.e., an acyl chloride of a fatty acid, containing from 12 to 18 carbon atoms in the molecule at temperatures not exceeding 170° C., preferably at temperatures between 90° C. and 115° C. until the exothermic reaction subsides, then at temperatures between 135° and 170° C. while mechanically working the ingredients in admixture with one another and withdrawing the vapors of the by-product hydrogen chloride from the reaction and thereafter neutralizing the reacted material with an alkali.

In U.S. Patent 2,861,090, there is described a continuous process for the manufacture of sulfoalkylesters of fatty acids by which the reaction mixture is prepared by grinding the organic acid salt of a reactive metal into a very fine powder, slurrying the powder with a carboxylic acid chloride to form a homogeneous slurry, and conducting the reaction on a heated metallic surface such as a drum-drier. This procedure is reported to yield a very excellent product and to be a very satisfactory method of conducting the reaction, with the disadvantage that the solid reactant must be very finely powdered, and that the reaction on the drum-drier is slow, thereby involving relatively high costs.

In U.S. 2,844,607, there is described a new process for the manufacture of sulfoethylesters of fatty acids which comprises forming a slurry by mixing together dry sodium isethionate in coarsely pulverized form with a fatty acid halide, delivering said slurry to a surface heated to an elevated temperature swept by rapidly moving members so as to produce a thin film of reaction product on a heated surface and simultaneously causing attrition of the film by the violent turbulence effected by the rapidly moving members, the turbulence and temperature being maintained until the reaction between the sodium isethionate and fatty acid halide is substantially completed, the attrition being utilized to separate the reaction product from the heated surface.

In the products prepared by many of the foregoing processes, and more specifically those synthesized from acyl halides manufactured by the reaction of a phosphorus halide with a fatty acid and those prepared directly from fatty acids in the presence of catalysts or color inhibitors derived from phosphorus, the final odor of the sulfoalkyl ester is quite often undesirable, and may often be described as rubbery, metallic, cabbage-like, etc.

The principal object of the present invention is to appreciably reduce the level of the odor of sulfoalkyl esters of fatty acids by treatment thereof with an oxidizing agent to remove phosphine.

Other objects and advantages will be more clearly manifest from the following description.

I have found that the level of odor is appreciably, if not substantially reduced in sulfoalkyl esters of fatty acids by a chemical treatment thereof designed to eliminate traces of phosphine. That the presence of phosphine in the sulfoalkyl ester of a fatty ester is the contributing factor to the undesirable odor is at first difficult to conceive. In other words, the presence of phosphine in sulfoalkyl esters of fatty acids is not expected when the physical properties of the gas itself are considered. For example, according to Langes Handbook of Chemistry, 6th ed. Handbook Publishers, Inc., Sandusky, Ohio, phosphine is a colorless gas with a melting point of $-132.5°$ C. and a boiling point of $-85°$ C.

J. W. Mellor, A Comprehensive Treatise on Inorganic and Theoretical Chemistry, vol. VIII, Longmans, Green and Co., New York, on page 811 describes phosphine as a gas with an odor suggesting a mixture of stinking fish and garlic. According to Sax, Handbook of Dangerous Materials, Reinhold Publishing Corp., New York, 1951 edition, page 306, the threshold of odor perception of phosphine is about 1 p.p.m. It is therefore conceivable that traces of the entrained gas, or contaminants readily converted phosphine, contribute to the odor effect often noticeable in the sulfoalkyl esters.

In the Encyclopedia of Chemical Technology, volume 10, 1953, Interscience Publishers, Inc., New York, page 488–489, in a discussion of acidic phosphorus compounds, the following disclosure is made:

Hypophosphorus acid ($H_3PO_2$) $\xrightarrow{133° C.}$ phosphoric and phosphorus acids, hydrogen and phosphine.

also

Phosphorus acid ($H_3PO_3$) $\xrightarrow[200° C.]{above}$ phosphine, phosphoric acid and water.

However, in the isethionic acid esters prepared by the reaction of an acyl halide with an alkali metal salt of isethionic acid, as described in U.S. Patent 1,881,172, U.S. 2,821,535, U.S. 2,861,090 and U.S. 2,844,607, the presence of phosphine, or compounds readily converted to phosphine at the operating temperature described in the prior art, is quite unexpected. Groggins, Unit Processes in Organic Synthesis, 4th ed., McGraw Hill Book Co., Inc., New York, describes the preparation of acyl halides of the higher fatty acids, including stearic acid and lauric acid, by the typical commercial method of reacting a fatty acid with phosphorus trichloride:

$$3RCOOH + 2PCl_3 \rightarrow 3ROCl + P_2O_3 + 3HCl$$

Fieser and Fieser, Organic Chemistry, 1944, D. C. Heath & Co., Boston, p. 185, prefer to consider the reaction as follows:

$$3RCOOH + PCl_3 \rightarrow 3ROCl + H_3PO_3$$

In either case, phosphorus aicd ($H_3PO_3$) or its anhydride, $P_2O_3$, is the acknowledged by-product of the reaction, and if introduced as a contaminant into the reaction mixture of sodium isethionate and the acyl halide during the preparation of the ester, should not form phosphine at temperature below 200° C. Furthermore, if an excess of $PCl_3$ is carried as a contaminant into the reaction mixture and traces of phosphine are present, Mellor, loc. cit., states phosphine and phosphorus trichloride at elevated temperatures forms elemental phosphorus and hydrogen chloride, and at ordinary temperatures hydrogen diphosphide, an odorless product, is formed.

In spite of the foregoing literature teachings, I have found that upon examination of samples of sulfoalkylesters of fatty acids prepared by either the direct dehydration of the sodium salt of 2-hydroxy-alkane sulfonic acid and a fatty acid in the presence of a phosphorus containing catalyst or by the reaction of a fatty acid chloride, prepared from a fatty acid and a phosphorus halide, with the sodium salt of a 2-hydroxy-alkane sulfonic acid, a positive test for phosphine is obtained. The test employed is a modification of the specific method for the determination of phosphine in small concentrations reported by W. Mueller, Arc. Hyg. Bakt. 129, p. 286–92, 1943; C.A. 38, 3216 (1944).

According to the process of the present invention, I have found that when sulfoalkyl esters of fatty acids, which have a pronounced objectionable odor and show a phosphine content as high as 25 p.p.m. or greater when examined by the test of W. Mueller, loc. cit., are given a chemical treatment with an oxidizing agent capable of oxidizing phosphine to a compound of a higher oxidation state, such as a phosphate, the objectionable odor disappears and the treated product upon re-examination by the method of W. Mueller, loc. cit., now has a phosphine content too low to be detected by the test method. Furthermore, the treated sample shows an increase in phosphate content over the untreated sample when examined for phosphoric acid by the method described in Feigl, Spot Tests, vol. I, 4th ed., Elsevier Publishing Company, N.Y., page 306.

Although any material reducible by phosphine may be used, including the usual oxidizing agents well known to the art and including hypochlorite, stannic salts, peroxides, cerates, chromates, permanganates, persulfates, periodates, bismuthates, arsenates, halogen gases, and the like, for ease of operation and the absence of undesirable by-products my preferred reactant is hydrogen peroxide. Concentrations of 200–2000 p.p.m. are normally required to eliminate odors attributed to phosphine.

The sulfoalkyl esters of fatty acids which are deodorized in accordance with the process of the present invention are characterized by the following general formula:

$$RCOO-CH-CH-SO_3M$$
$$\phantom{RCOO-C}|\phantom{H-C}|$$
$$\phantom{RCOO-CH}R_1\phantom{-CH-}R_1$$

wherein R represents an alkyl radical of at least 8 carbon atoms, preferably from 8 to 22 carbon atoms and is characterized as the alkyl residue of a saturated or unsaturated monocarboxylic acid, $R_1$ represents either hydrogen, methyl or ethyl, and M represents an alkali or alkaline earth metal, e.g. calcium magnesium, barium, lithium, sodium or potassium.

As previously noted, the sulfoalkyl esters of fatty acids are prepared either by the condensation of an alkali metal or an alkaline earth metal salt of 2-hydroxy alkane sulfonic acid with a monocarboxylic fatty acid of at least 8 carbon atoms or a monocarboxylic fatty acid chloride of at least 8 carbon atoms. Acids of this type, i.e., either as carboxylic acids or carboxylic acid chlorides include: caprylic, pelargonic, capric, lauric, myristic, palmitic, stearic, oleic, linoleic, linolenic, lauronolic, tall oil acid, hydrogenated tall acids, hydrogenated tallow acids, and the like.

The 2-hydroxyalkane sulfonic acid salts that are condensed with the foregoing monocarboxylic acids or acid chlorides are characterized by the following general formula:

$$HO-CH-CH-SO_3M$$
$$\phantom{HO-C}|\phantom{H-C}|$$
$$\phantom{HO-CH}R\phantom{-CH-}R$$

wherein R represents either hydrogen, methyl or ethyl, and M represents an alkali or alkaline earth metal, e.g. calcium magnesium, barium, lithium, sodium or potassium.

As examples of 2-hydroxyalkane sulfonic acids that are reacted in the form of their salts with the above monocarboxylic acids to form anionic surface active agents, the following are illustrative:

Isethionic acid
2-hydroxy-propane-sulfonic acid
2-hydroxy-3-butane-sulfonic acid
2-hydroxy-1-butane-sulfonic acid The above 2-hydroxyalkane sulfonic acids are employed in the form of their sodium, potassium, calcium, magnesium etc., salts or secondary or tertiary amino salts. The salts are readily prepared by neutralization of the acid with an equivalent amount of an alkali metal or alkaline earth metal hydroxide or carbonate, or secondary or tertiary amine.

In practicing the present invention, any sulfoalkyl ester of a fatty acid characterized by the foregoing general formula is readily deodorized from objectionable odor by simply treating the sulfoalkyl ester of the fatty acid, following synthesis and neutralization with alkali to an approximate pH of 7, with hydrogen peroxide so that the concentration thereof in the sulfoalkyl ester of a fatty acid ranges from 200 to 2,000 p.p.m. In other words, a sufficient quantity of hydrogen peroxide is merely mixed with a substantially neutral sulfoalkyl ester of a fatty acid. The time of mixing is immaterial and may range anywhere from 5 to 30 minutes.

The following examples illustrate ways in which the principle of the invention is applied, but are not to be construed as limiting its scope:

Example I 218.7 grams of lauryl chloride (1 M) prepared by the reaction of phosphorus trichloride on lauric acid was reacted with 148 grams of sodium isethionate (1 M) in a laboratory blender equipped with blades to knead and mechanically work the ingredients at 120° C. until the evolution of hydrogen chloride ceased. The product was cooled with kneading to 25° C., and sufficient sodium hydroxide admixed with the product to produce a pH of 7 when a sample was dissolved in water. One-half of the powder was removed as a control, and the remainder admixed with 1 gram of 30% hydrogen peroxide at 25° C. for fifteen minutes. Both samples were then subjected to an odor panel, and analyzed for phosphine and qualitatively examined for phosphate.

The odor of the control sample was judged as metallic, musty, and objectionable. The odor of the sample treated with peroxide was judged as a typical fatty acid odor with no objectionable side odors. Upon analysis, the control was found to contain >38 p.p.m. phosphine, the sample treated with peroxide <1 p.p.m. phosphine. A qualitative phosphate test indicated a trace of phosphate in the control sample, and substantially more in the treated sample.

*Example II*

An admixture of 258.5 grams of coconut fatty acid (1.22 moles MW 212), 103.5 grams of sodium isethionate (0.7 mole) and 8.5 grams of aqueous 50% hypophosphorus acid was heated for two hours at 205° C. Upon cooling, the coconut acid ester of sodium isethionate, obtained in 99% of the theoretical yield, was ground in a mechanical mixer and adjusted to pH 6.7 with 4.2 grams of sodium hydroxide. One-half of the product was removed as a control, and the remainder reacted in the dry state with 0.25 gram of 30% hydrogen peroxide. The control sample analyzed >25 p.p.m. phosphine. The treated sample analyzed <1 p.p.m. phosphine. An odor panel judged the control sample to have a rubber-like musty odor. The treated sample was judged to have a pleasant coconut fat odor.

*Example III*

Operating as in Example I, 303 grams of stearoyl chloride (1 M) was reacted with 164 grams (1 M) of potassium isethionate in a laboratory blender at 125° C. until evolution of hydrogen chloride ceased. The product was neutralized without cooling to pH 7.4 by addition of potassium hydroxide, and a sample withdrawn for analysis. A solution of 0.5 gram 30% hydrogen peroxide in 10 ml. of water was added over 15 minutes at 125° C. to the remaining charge, and kneading at 125 °was continued for ½ hour. The untreated sample analyzed >40 p.p.m. phosphine. The treated product analyzed <2 p.p.m. phosphine.

*Example IV*

Operating as in Example I, 290 grams (1 M) of a fatty acid chloride prepared from commercial tallow fatty acid was reacted with 160 grams (1 M) sodium β-methylisethionate in a laboratory blender at 120–130° C. for 3 hours. The product was cooled to 90° C. and adjusted to pH 6.8 by addition of approximately 8 cc. of a 25% aqueous solution of sodium carbonate. One-half of the product was removed as a control, and the remaining half admixed ½ hour at 90° C. with 1 gram of 10% hydrogen peroxide. Upon discharge, the untreated portion contained by analysis 40 p.p.m. phosphine, and was judged as a sharp metallic in odor. The peroxided product gave no test for phosphine and was judged equivalent in odor to tallow acid.

*Example V*

Operating as in Example I, 292 grams of tall oil acid chloride (1 M), 172 grams (1 M) of sodium β-ethylisethionate were substituted for 218.7 grams of lauryl chloride and 148 grams of sodium isethionate. The control sample, musty in odor, contained by analysis 25 p.p.m. phosphine, while the peroxide treated sample, pleasant in odor, contained by analysis less than 1 p.p.m. phosphine.

*Example VI*

Operating as in Example I, 274 grams of palmitic acid chloride (1 M) and 172 grams of the sodium salt of 2-hydroxy-3-butane sulfonic acid were substituted for 218.7 grams of lauric acid chloride and 148 grams of sodium isethionate. The control, musty in odor, contained by analysis 37 p.p.m. phosphine, while the treated sample, with good odor, contained by analysis less than 2 p.p.m. of phosphine.

I claim:
1. The process of substantially eliminating the odor of phosphine present in sulfoalkyl esters of fatty acids having the following general formula

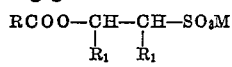

wherein R represents an alkyl radical of from 8 to 22 carbon atoms, $R_1$ represents a member selected from the class consisting of hydrogen, methyl and ethyl groups and M represents a metal selected from the group consisting of alkali and alkaline earth metal, which comprises treating the sulfoalkyl ester of fatty acid in substantially neutral form with hydrogen peroxide in a quantity ranging from 200 to 2,000 parts per million of said hydrogen peroxide.

2. The process according to claim 1 wherein the sulfoalkyl ester of a fatty acid is the lauric acid ester of sodium isethionate.

3. The process according to claim 1 wherein the sulfoalkyl ester of a fatty acid is the coconut acid ester of sodium isethionate.

4. The process according to claim 1 wherein the sulfoalkyl ester of a fatty acid is the stearic acid ester of potassium isethionate.

5. The process according to claim 1 wherein the sulfoalkyl ester of a fatty acid is the tallow acid ester of sodium β-methylisethionate.

6. The process according to claim 1 wherein the sulfoalkyl ester of a fatty acid is the tall oil acid ester of β-ethylisethionate.

7. The process according to claim 1 wherein the sulfoalkyl ester of a fatty acid is the palmitic acid ester of the sodium salt of 2-hydroxy-3-butanesulfonic acid.

References Cited in the file of this patent
UNITED STATES PATENTS

| | | |
|---|---|---|
| 1,734,050 | Seck | Nov. 5, 1929 |
| 2,006,766 | Hueter | July 2, 1935 |
| 2,460,968 | Bert et al. | Feb. 8, 1949 |
| 2,804,466 | Schurman | Aug. 24, 1957 |